(12) United States Patent
Bloom et al.

(10) Patent No.: US 7,782,381 B2
(45) Date of Patent: Aug. 24, 2010

(54) GENERATING AN INSTANT REVIEW IMAGE USING FRACTIONAL READOUTS

(75) Inventors: Daniel Bloom, Loveland, CO (US);
Scott A. Woods, Bellvue, CO (US);
Daniel G. Franke, Berthoud, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 462 days.

(21) Appl. No.: 11/738,771

(22) Filed: Apr. 23, 2007

(65) Prior Publication Data

US 2008/0259196 A1 Oct. 23, 2008

(51) Int. Cl.
*H04N 3/14* (2006.01)
*H04N 5/335* (2006.01)

(52) U.S. Cl. ...................... 348/294; 348/317

(58) Field of Classification Search ............ 348/294, 348/317
See application file for complete search history.

(56) References Cited

U.S. PATENT DOCUMENTS

| 5,396,290 | A | * | 3/1995 | Kannegundla et al. | ...... 348/312 |
| 5,489,945 | A | * | 2/1996 | Kannegundla et al. | ...... 348/521 |
| 6,707,498 | B1 | * | 3/2004 | Toma et al. | .................. 348/311 |
| 7,388,607 | B2 | * | 6/2008 | Nakahira | ................ 348/240.2 |
| 7,499,080 | B2 | * | 3/2009 | Hattori et al. | ............ 348/220.1 |
| 2007/0252074 | A1 | * | 11/2007 | Ng et al. | .................. 250/208.1 |

\* cited by examiner

*Primary Examiner*—James M Hannett

(57) ABSTRACT

A method for creating an instant review image is disclosed. The method starts by creating image data by exposing an image sensor to a scene. A first sub-set of the image data is transferred from the image sensor and used to create an instant review image. The rest of the data is transferred from the image sensor and essentially all of the data from the image sensor is used to create a second image.

19 Claims, 3 Drawing Sheets

GENERATING AN INSTANT REVIEW IMAGE USING FRACTIONAL READOUTS

BACKGROUND

In a digital imaging device, for example a digital camera, an instant review (IR) image is the image displayed to the user immediately after the user has captured an image. The instant review image is typically a sub-sampled or reduced-resolution copy of the image captured by the user. The ability to produce and display the IR image quickly is advantageous to the user of the digital imaging device.

Currently, digital imaging devices have a time lag between when the user presses the shutter button to capture an image and when the instant review image is displayed. The time lag may be the result of a number of factors including the time required to clock the full image out of the image sensor, the time required to down-sample the image, the time required to color correct the image, and the like. Color correction may include using tone maps, white balancing the image, and the like.

The time required for each of these functions is dependent on the size of the image sensor inside the digital imaging device. The current trend is to increase the size of the image sensor. 10 and 12 mega-pixel sensors, once considered only for professional grade cameras, are now commonplace inside digital cameras aimed at the consumer market. As the image sensors become larger, the time lag between triggering an image capture, and displaying the instant review image, may become longer.

DETAILED DESCRIPTION

Figure 1:
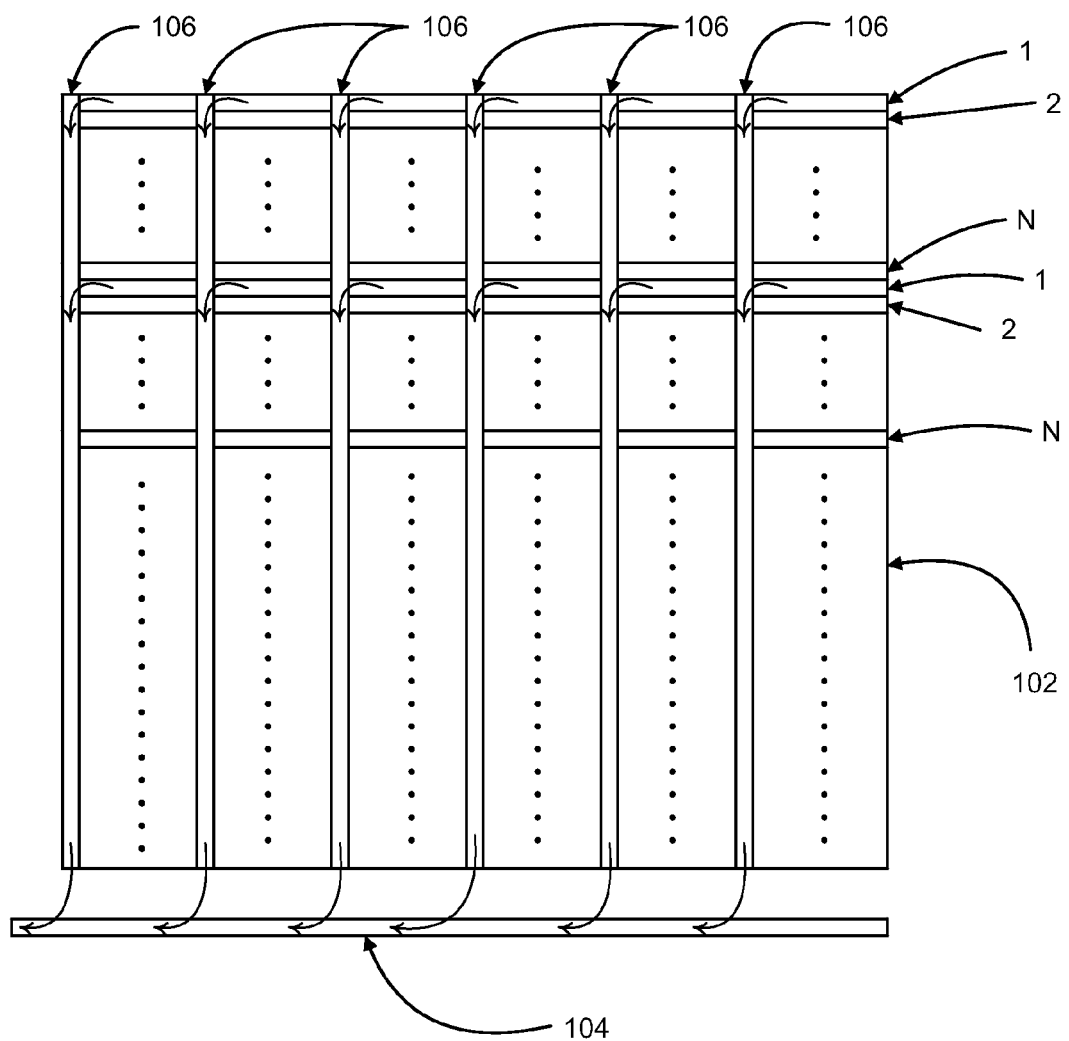
FIG. 1. is a block diagram of image sensor 102 used in an example embodiment of the invention.

FIG. 1 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Digital imaging devices use a number of different types of image sensors. One type of image sensor used is a charged coupled device (CCD). CCD's are typically comprised of an array of pixels that convert light into an electrical charge. The charge from each pixel is clocked out of the CCD and converted into the digital domain using an analog-to-digital (A/D) converter. As the size of the CCD increases, the number of pixels also increases. As the number of pixels increase, the time needed to clock out the charge from each of the pixels also increases.

The image sensors inside digital imaging devices typically operate in at least two modes, a fast or video mode and a still image mode. In the fast or video mode the time between capturing each image from the CCD is minimized (i.e. the frame rate is maximized). In the still image mode the resolution of the captured image is maximized.

The frame rate is increased in the fast or video mode by limiting the number of pixels from the CCD that are clocked out and used for the image. This is known in the arts as a partial readout or fractional readout of the image sensor. There are a plurality of methods used to select and clock out a limited number of pixels from the image sensor. Each method either throws away or combines charges from different pixels to reduce the total number of pixels clocked out of the CCD.

The fast or video mode may be used for a number of different functions including: live view, auto focus, auto exposure, predicting color correction factors, image analysis, video capture and the like. There may be more than one fractional readout mode where a different fractional readout mode is used for some of the different functions. For example one fast mode may be used for auto-focus and a different fast mode may be used for video capture.

In the still image mode, essentially all the pixels from the CCD are clocked out and used for the image. Because the instant review image is currently created from an image captured using the still image mode, the instant review image is not created until the full image has been clocked out of the CCD.

FIG. 1 is a block diagram of CCD 102 used in an example embodiment of the invention. CCD 102 has a horizontal channel 104, a plurality of vertical channels 106 and a plurality of light integration (pixels) sites grouped in horizontal rows. The plurality of horizontal rows are grouped into fields (1 to N) in a vertically repeating pattern. Each vertical channel receives its data from 1 to N pixels, where N is the number of fields in the sensor. Stated differently, in an interline-interlaced CCD, there is a vertical read channel for each pixel in the horizontal direction, but the number of vertical read channels in the vertical direction is reduced by N, where N is the number of readout fields the sensor supports. In order to read out the entire image, it is necessary to clock out the vertical read channels N times, and to fill these channels from different pixel sites each time the vertical channels have been flushed.

When clocking out an image using the still image mode, all the pixels corresponding to a field, for example field 1, are clocked into the vertical channels 106 in a bucket brigade fashion. In the context of this disclosure, a "bucket brigade" is a process of moving charge from one pixel location to an adjacent pixel within specific timing limits. This allows the image to be clocked out by measuring signal at one set of outputs connected at the edge of each row of CCDs. The electrical signal on these outputs change with time to reflect the sequence in which the charges are "marched" out of the CCD.

The vertical channels 106 are clocked into horizontal channel 104 using the bucket brigade fashion, and then clocked out of the CCD 102. Once the charges from the pixels in the first field have been clocked out of the vertical channels 106, the pixels corresponding to the next field are clocked into the vertical channels 106, and from the vertical channels 106 into the horizontal channel 104. This continues until all the charges from the pixels corresponding to each field have been clocked out of the CCD. The final image typically comprises pixels from all the fields.

The number of fields in a CCD can vary and depends on the pixel size, the spacing between the vertical channels, and the like. Typically, a CCD has between 1 and 6 fields. Each field in a CCD represents $1/n^{th}$ of the total image where N is the number of fields in the CCD. For example when a CCD has 5 fields, each field contains $1/5^{th}$ of the image (sampled vertically every $5^{th}$ line). Typically each field takes the same amount of time to clock out, or $1/n^{th}$ of the total time, where N is the number of fields in the CCD. For example when a CCD has 5 fields and each field takes 250 milliseconds to clock out, the total time to clock out the full image would be 1.250 seconds.

Once all the raw image data has been clocked out of the CCD, the raw image data is corrected to create the final still image. The raw image data may be corrected using a number of different techniques including tone map correction, white balancing, white point correction, cropping, filtering, redeye reduction, channel balancing, and the like. Because the instant review image is currently created from the final still image, creating the instant review image must wait until the all the raw data has been clocked out of the CCD and until the raw data has been corrected to create the final still image. A significant portion of the wait time occurs as the data is being clocked out of the CCD.

In one example embodiment of the invention, the instant review image is created from an image captured using the still image mode, but before all the raw image data has been completely clocked out of the CCD. The instant review image is created using the image data from the first one or two fields clocked out of the CCD. When using only the first field to create the instant review (IR) image, the creation of the IR image can be started after only $1/n^{th}$ the total time used to clock out the full image from the CCD, where N is the total number of fields. For example when a CCD has 5 fields and each field takes 250 milliseconds to clock out, the creation of the IR image can be started after only 250 milliseconds. This allows the creation of the IR image to start a full second before the all the raw image data has been completely clocked out of the CCD.

As the instant review image is being created, the rest of the raw image data is simultaneously being clocked out of the CCD. As discussed above, the instant review image is typically a lower resolution copy of the full image. By using the data from only one field to create the IR image, the full image from the CCD has already been sub-sampled in the vertical direction by the number of fields in the CCD. For example, when the CCD has 5 fields, using only one field creates an image that has been sub-sampled by $1/5$ in the vertical direction. The raw image data from the first field may be further sub-sampled in the vertical direction and sub-sampled in the horizontal direction to create the instant review image. The raw image data from the first field is preserved during the creation of the IR image. The preserved raw first field data, along with the raw data from the other fields, is used to create the final still image.

The raw first field data may be modified or corrected in other ways, in addition to being sub-sampled, to create the instant review image. Some corrections may include tone map correction, white balancing, white point correction, cropping, filtering, redeye reduction, channel balancing, and the like. These corrections may use information derived from previous exposures, from information contained in the raw first field data, or a combination of both.

Most image sensors are covered with an array of color filters in a Bayer pattern. A Bayer pattern has a first row of filters with alternating green and blue colors and a second row of filters with alternating green and red colors. Therefore all the even numbered rows in an image sensor with a Bayer pattern measure green and blue light, and all the odd numbered rows measure green and red light. To measure all three colors (green, red, and blue) at least one even numbered row and at least one odd numbered row needs to be examined.

Some image sensors have an even number of fields and some have an odd number of fields. When an image sensor has an odd number of fields, for example 5 fields, the first field collects pixels from both even numbered rows and odd numbered rows in the image sensor. An image sensor with 5 fields collects pixel information from the following rows in the image sensor: row 1, row 6, row 11, row 16 . . . through row N+5, where N+5 is equal to the total number of rows in a CCD. Because field 1 collects green/blue and green/red rows, field one contains all the color information needed to create an image.

When an image sensor has an even number of rows and is covered with a color filter using a Bayer pattern, two fields may need to be clocked out of the image sensor before an image can be created.

Figure 2:
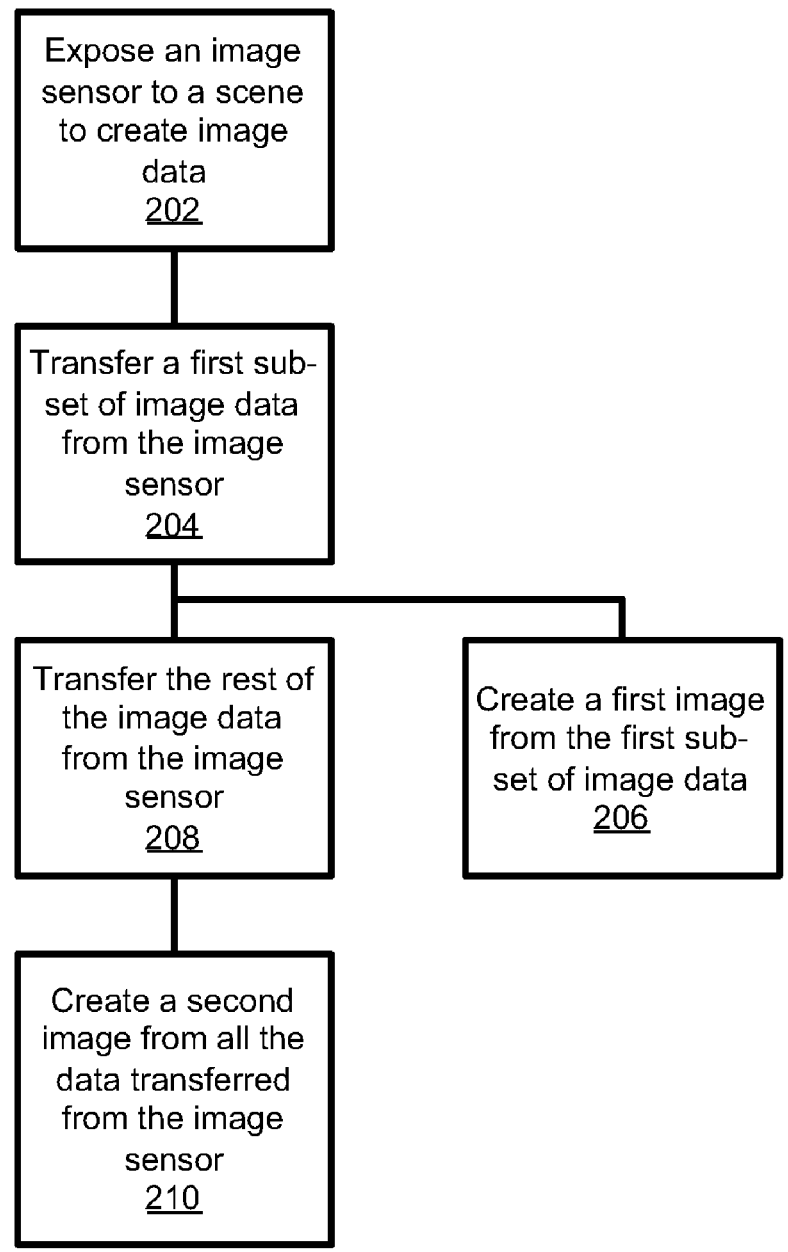
FIG. 2. is a flow chart showing an example embodiment of the invention.

FIG. 2 is a flow chart showing an example embodiment of the invention. At step 202 an image sensor is exposed to a scene causing the image sensor to generate raw image data. At step 204 a first sub-set of the raw image data is transferred from the image sensor. At step 206 a first image is created from the first sub-set of image data. At step 208 the rest of the image data is transferred from the image sensor. In one example embodiment of the invention, transferring the second sub-set of data at step 208 occurs at the same time that the first image is being created in step 206. At step 210 a second image is created using all of the image data that was transferred from the image sensor.

Once the first image is created at step 206, the first image may be displayed. The first image may be displayed before the second sub-set of raw image data has been completely transferred from the image sensor. In one example embodiment of the invention the first image is an instant review image and the second image is a final still image.

Creating the first image at step 206 may include down sampling the raw image data in one or both directions (the x and y directions) and may include color correcting the raw image data. The raw image data may be color corrected using a number of different techniques including tone map correction, white balancing, white point correction, cropping, filtering, redeye reduction, channel balancing, and the like.

When the image sensor has an odd number of fields, the first sub-set of raw image data transferred in step 204 will be from only one field. When the image sensor has an even number of fields, the first sub-set of raw image data transferred in step 204 will be from two fields. When the image sensor has an even number of fields, the two fields used to create the first sub-set of image data may not be fields adjacent to each other. By using non-adjacent fields, a more even sub-sampling of the image in the vertical direction would be produced than using fields adjacent to one another.

In some example embodiments of the invention, circuitry may be used to transfer the first sub-set of image data from the image sensor and a processor may be used to create the first image from the first sub-set of data. As the processor is creating the first image, the circuitry will be simultaneously transferring the rest of the data from the image sensor. In other example embodiments of the invention, the two tasks may be executed using a multi-threaded processing system.

Figure 3:
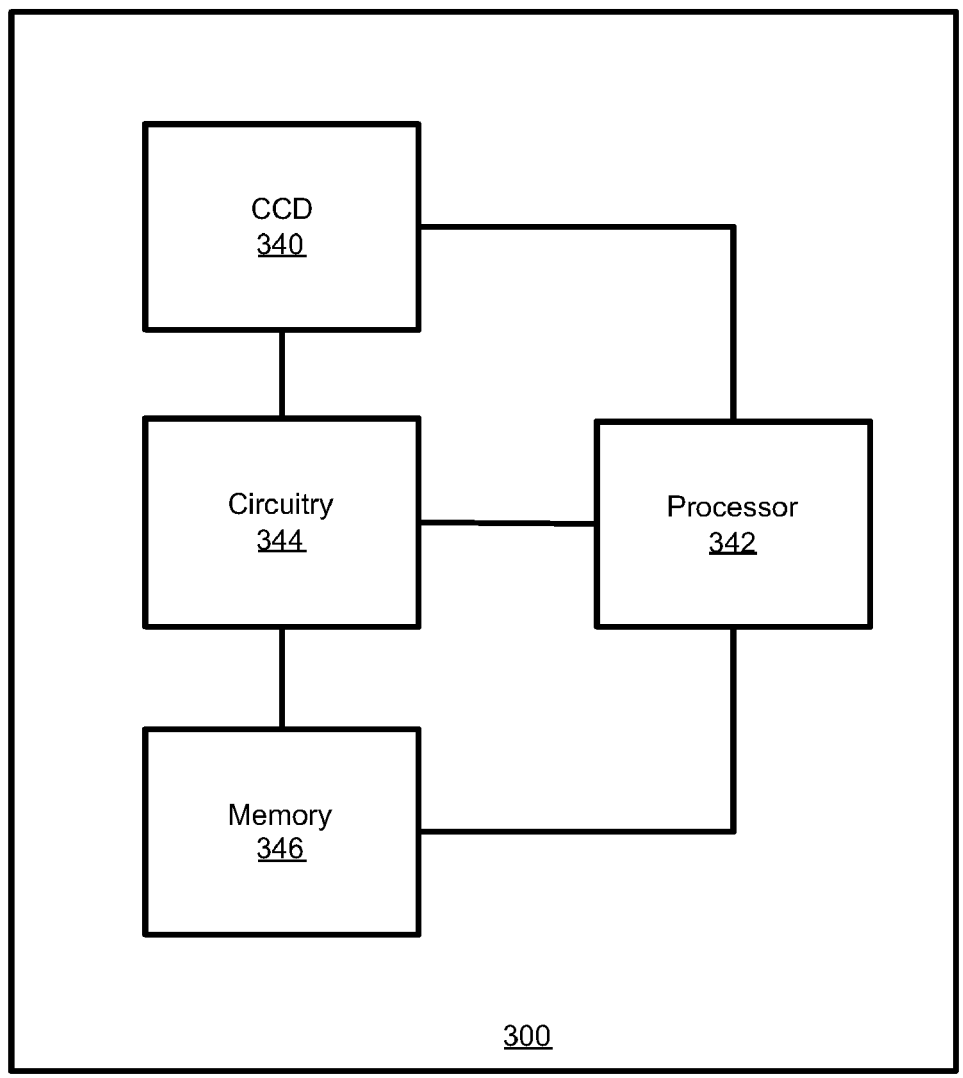
FIG. 3. is a block diagram of CCD board 300 used in one example embodiment of the invention.

FIG. 3 is a block diagram of CCD board 300 used in one example embodiment of the invention. CCD board 300 comprises a CCD 340, a processor 342, circuitry 344 and memory 346. Circuitry 344 is coupled to CCD 340 and configured to transfer raw image data from CCD 340 into memory 346. Processor 342 is coupled to circuitry 344, CCD 340 and to memory 346. Processor 342 is configured to control CCD 340 and circuitry 344 and to create images from the raw image data transferred by circuitry 344 from CCD 340. Processor 342 may be used to control other components not shown for clarity.

A CCD was used (above) to describe an example embodiment of the invention, however this invention is not limited to CCD's but may be used for any type of image sensor, for example CMOS sensors.

What is claimed is:

1. A method, comprising:
   creating raw image data by exposing an image sensor to a scene;
   transferring a first sub-set of the raw image data from the image sensor;
   creating a first image from the first sub-set of raw image data;
   transferring a second sub-set of the raw image data from the image sensor where the first sub-set plus the second sub-set equals all of the raw image data;
   creating a second image from all of the raw image data; and
   wherein the first sub-set of raw image data comprises the raw image data corresponding to a single field when the image sensor has an odd number of fields, and the first sub-set of raw image data comprises the raw image data corresponding to two fields when the image sensor has an even number of fields.

2. The method of claim 1, further comprising:
   displaying the first image before the second sub-set of raw image data has been completely transferred from the image sensor.

3. The method of claim 1, wherein the image sensor is selected from the group comprising a changed coupled device (CCD) or a complementary metal-oxide-semiconductor (CMOS) sensor.

4. The method of claim 1, wherein the two fields are not adjacent.

5. The method of claim 1, wherein creating the first image comprises:
   down sampling the raw image data in at least one direction; and
   color correcting the raw image data.

6. The method of claim 1, wherein creating the first image and transferring the second sub-set of the raw image data from the image sensor occur concurrently.

7. The method of claim 1, wherein the first image is an instant review image and the second image is a final still image.

8. A digital imaging device, comprising:
   an image sensor configured to create image data when exposed to a scene;
   circuitry configured to transfer a first sub-set of the image data from the image sensor;
   a processor configured to create a first image from the first sub-set of image data;
   the circuitry configured to transfer a second sub-set of the image data from the image sensor wherein the first sub-set already transferred from the image sensor to create the first image plus the second sub-set equals all of the image data;
   the processor configured to create a second image from all of the image data; and
   wherein the first sub-set of image data comprises the image data corresponding to a single field when the image sensor has an odd number of fields, and the first sub-set of image data comprises the image data corresponding to two fields when the image sensor has an even number of fields.

9. The digital imaging device of claim 8, wherein the processor is configured to display the first image before the second sub-set of image data has been completely transferred from the image sensor.

10. The digital imaging device of claim 8, wherein the image sensor is selected from the group comprising a changed coupled device (CCD) or a complementary metal-oxide-semiconductor (CMOS) sensor.

11. The digital imaging device of claim 8, wherein the two fields are not adjacent.

12. The digital imaging device of claim 8, wherein creating the first image comprises:
    down sampling the image data in at least one direction; and
    color correcting the image data.

13. The digital imaging device of claim 8, wherein creating the first image and transferring the second sub-set of the raw image data from the image sensor occur concurrently.

14. The digital imaging device of claim 8, wherein the first image is an instant review image and the second image is a final still image.

15. A digital imaging device, comprising:
    an image sensor configure to create image data when exposed to a scene;
    means for transferring a first sub-set of the image data from the image sensor;
    means for creating a first image from the first sub-set of image data;
    means for transferring a second sub-set of the image data from the image sensor where the first sub-set plus the second sub-set equals all of the image data;
    means for creating a second image from all of the image data; and
    wherein the first sub-set of the image data comprises image data corresponding to a single field when the image sensor has an odd number of fields, and the first sub-set of image data comprises the image data corresponding to two fields when the image sensor has an even number of fields.

16. The digital imaging device of claim 15, further comprising:
    means for displaying the first image before the second sub-set of raw image data has been completely transferred from the image sensor.

17. The digital imaging device of claim 15, wherein the first image is an instant review image and the second image is a final still image.

18. A method, comprising:
    creating raw image data by exposing an image sensor to a scene;
    transferring a first sub-set of the raw image data from the image sensor;
    creating a first image from the first sub-set of raw image data;
    transferring a second sub-set of the raw image data from the image sensor where the first sub-set plus the second sub-set equals all of the raw image data;
    creating a second image from all of the raw image data; and
    wherein creating the first image and transferring the second sub-set of the raw image data from the image sensor occur concurrently.

19. A digital imaging device, comprising:

an image sensor configured to create image data when exposed to a scene;

circuitry configured to transfer a first sub-set of the image data from the image sensor;

a processor configured to create a first image from the first sub-set of image data;

the circuitry configured to transfer a second sub-set of the image data from the image sensor wherein the first sub-set already transferred from the image sensor to create the first image plus the second sub-set equals all of the image data;

the processor configured to create a second image from all of the image data; and wherein creating the first image and transferring the second sub-set of the raw image data from the image sensor occur concurrently.

* * * * *

UNITED STATES PATENT AND TRADEMARK OFFICE
CERTIFICATE OF CORRECTION

| | | |
|---|---|---|
| PATENT NO. | : 7,782,381 B2 | Page 1 of 1 |
| APPLICATION NO. | : 11/738771 | |
| DATED | : August 24, 2010 | |
| INVENTOR(S) | : Daniel Bloom et al. | |

It is certified that error appears in the above-identified patent and that said Letters Patent is hereby corrected as shown below:

In column 6, line 26, in Claim 15, delete "configure" and insert -- configured --, therefor.

Signed and Sealed this
Eighth Day of February, 2011

David J. Kappos
*Director of the United States Patent and Trademark Office*